US006687451B1

United States Patent
Sikora (10) Patent No.: US 6,687,451 B1
(45) Date of Patent: Feb. 3, 2004

(54) METHOD AND SYSTEM FOR FIRST-ORDER RF AMPLITUDE AND BIAS CONTROL OF A MODULATOR

(75) Inventor: John K. Sikora, Allen, TX (US)

(73) Assignee: Alcatel, Paris (FR)

( * ) Notice: Subject to any disclaimer, the term of this patent is extended or adjusted under 35 U.S.C. 154(b) by 583 days.

(21) Appl. No.: 09/670,769

(22) Filed: Sep. 27, 2000

(51) Int. Cl.$^7$ ............................................... H04B 10/16
(52) U.S. Cl. ....................................... 385/187; 398/198
(58) Field of Search ................................. 359/237, 245; 398/23, 115, 195, 198, 182, 183, 187

(56) References Cited

U.S. PATENT DOCUMENTS

| | | | |
|---|---|---|---|
| 5,003,624 A | * 3/1991 | Terbrack et al. | 398/198 |
| 5,343,324 A | * 8/1994 | Le et al. | 398/198 |
| 5,900,621 A | * 5/1999 | Nagakubo et al. | 250/205 |
| 6,078,418 A | * 6/2000 | Hansen et al. | 398/147 |
| 6,204,954 B1 | 3/2001 | Nagarajan | |

* cited by examiner

Primary Examiner—Hung N. Hgo (74) Attorney, Agent, or Firm—Jessica W. Smith; V. Lawrence Sewell (57) ABSTRACT

A method and system are disclosed for robustly (using first order effects) controlling the bias point and radio frequency (RF) amplitude level of a modulator for an optical transmitter. The method comprises the steps of extracting an output dither signal component of a digital optical output signal from the optical transmitter to drive a feedback loop; measuring the output dither signal component in the feedback loop for comparison to an input dither signal to the modulator; comparing the output dither signal to the input dither signal to determine their difference; and, based on the difference between them, maintaining the bias point and the RF amplitude level at an optimum value by varying an input voltage to the modulator via the feedback loop. One embodiment of the system of this invention comprises a laser for providing an input light, a modulator to modulate the input light and generate a digital optical output signal, a radio frequency (RF) feedback loop to control an RF input voltage to the modulator, a bias feedback loop to control a bias input voltage to the modulator, an RF amplitude dither circuit to provide an RF input dither signal to the RF voltage input, and a bias dither circuit to provide a bias input dither signal to the bias voltage input. The modulator can be a Mach-Zehnder modulator.

59 Claims, 5 Drawing Sheets

METHOD AND SYSTEM FOR FIRST-ORDER RF AMPLITUDE AND BIAS CONTROL OF A MODULATOR

PRIORITY UNDER 35 U.S.C. §119(e) & 37 C.F.R. §1.78

This nonprovisional application claims priority based upon the following prior United States provisional patent application entitled: "Feedback Control Of The Clock/Data Phase In A Two-Stage Match-Zehnder RZ Modulator," filed Aug. 25, 2000, Serial No.: 60/228,237, in the name(s) of: John K. Sikora, which is hereby incorporated by reference for all purposes.

TECHNICAL FIELD OF THE INVENTION

This invention relates generally to digital lightwave communications systems and, in particular, to methods and systems for modulating the output of a digital lightwave communications system. Even more particularly, the present invention relates to a method and system for first-order radio frequency ("RF") amplitude and bias control of a modulator.

BACKGROUND OF THE INVENTION

One of the most important competitive characteristics of a lightwave transmission system is how large a distance can be spanned between a receiver and transmitter while maintaining the integrity of the transmitted data. Such systems can be limited by the output power of the transmitter or by the receiver performance characteristics, specifically receiver sensitivity. The method of modulating the digital output from a transmitter can also greatly influence the distance separating the transmitter from the receiver. Modulating a digital lightwave output generates the digital "1"'s and digital "0"'s that are transmitted, and hence determines the content and integrity of the digital signal. From an economic viewpoint, the distance that can be spanned between a transmitter and receiver, while maintaining data integrity, determines the expenditures that must be made to physically lay fiber in the ground or to install repeaters and other supporting equipment.

One way to control the output of a digital lightwave communications system is to directly modulate the laser light source. For example, the laser could be turned on and off at intervals, thus generating digital 1's (on) and digital 0's (off). This can be accomplished by turning the current to the laser on and off. While this method may work in lower speed digital communications systems, in high-speed digital lightwave communications it is not practical to directly modulate the output of the laser because, as the current to the laser is changed, the wavelengths of the laser outputs are also slightly changed.

Direct laser modulation could thus cause significant dispersion in each of the different wavelengths traveling along a fiber optic cable, resulting in noise and data corruption at the receiver end of a high-speed digital lightwave system. This is because, particularly in a directly modulated laser system, multiple wavelengths are introduced by the modulation process. Each of these wavelengths has a slightly different propagation time, resulting in overlap at the receiver and therefore in possible data corruption and/or loss. In WDM (wavelength division multiplexing) systems, a significant amount of noise also results from carrying multiple wavelengths on a single fiber. This can result in loss of receiver sensitivity, because it is more difficult for the receiver to distinguish between the digital 1's and 0's, and hence to interpret the data carried by the signal.

High speed digital lightwave communications systems instead use modulators to modulate the laser output. Modulators do not affect the wavelengths carrying the data signal as much as direct modulation. However, these modulators require an RF amplitude input and bias point that must be set and maintained at or near an optimum value for each modulator. Otherwise, the resulting wavelength shift in the transmitted data, along with the inherent noise and dispersion occurring in WDM transmission systems, can result in the signals received at the receiver being noisy and difficult to differentiate.

Every modulator, such as a Mach-Zehnder modulator, can have a slightly different optimum RF amplitude input voltage (a peak-to-peak voltage $V_\pi$) and a slightly different optimum bias point (voltage). Together this optimum bias point and optimum RF amplitude $V_\pi$ provide the best extinction ratio (the ratio between full light output to no light output) for the modulator. As the RF amplitude level drifts away from optimum ($V_\pi$), the received signal becomes noisier, resulting in increased difficulty for the receiver in differentiating the 1's and 0's that comprise the signal. Similar signal degradation also occurs with changes in the bias point away from its optimum value.

Current high-speed digital lightwave transmission systems manually set the RF amplitude as close as possible to the optimum value $V_\pi$ and have no mechanism for automatically maintaining the RF amplitude at or near its optimum point. This "set-it-and-forget-it" methodology cannot compensate for changes in the RF amplitude that might occur over time. For example, as temperature changes, the $V_\pi$ of the modulator will likely also change, as will the gain of the RF amplifier. An RF amplifier gain that is set and forgotten can thus change over time due to shock, vibration and/or changes in temperature, resulting in a received signal that is fuzzy and difficult to differentiate by the receiver. Also, the possibility exists that the RF amplitude may initially be set too high or too low due to operator error. As a result, the RF amplitude of the circuit cannot track changes within the modulator, or in the RF train, over temperature and time.

Another problem with current high-speed digital lightwave transmission systems is that the bias value is controlled by dithering the bias signal itself. Dithering of the bias signal to control bias value leads to what are called second-order effects in the dither. This means that, for example, if the bias is dithered at 500 Hz, then the output that must be looked for to control the bias value occurs at 1,000 Hz (i.e., the second harmonic of the dither signal). These second-order effects are much lower in amplitude than first-order (direct relationship) effects. Second-order effects can be analogized to the second derivative of a signal, which most closely approaches a flat line. The result of using second-order effects to control the bias is that prior art circuits must use a much greater amount of dither. It also means that the bias control circuitry must be much more sensitive and complex to identify the output control signal. A second-order circuit also generates more noise and tends to wander (is more imprecise than a first-order circuit).

Prior art second-order circuits are also not very robust, in that they are not high-gain circuits that can differentiate well between signal and noise, resulting in a circuit that is very susceptible to noise. These second-order circuits thus have a poor signal-to-noise ratio and have difficulty in differentiating and extracting the loop feedback signal from the noise.

SUMMARY OF THE INVENTION

Therefore, a need exists for a method and system for controlling the RF amplitude and bias value of a modulator using first-order linear effects.

A further need exists for a method and system for first-order RF amplitude and bias control of a modulator that uses a feedback loop to control RF amplitude, so that RF amplitude can track changes in the modulator and in the RF train, over temperature and time.

Still further, a need exists for first-order RF amplitude and bias control of a modulator having a high signal-to-noise ratio and comprising a robust circuit high bandwidth feedback loops.

The present invention provides a method and system for first-order RF amplitude and bias control of a modulator that substantially eliminates or reduces disadvantages and problems associated with previously developed methods and systems for RF amplitude and bias control of a modulator within a digital lightwave communications system.

In particular, the present invention provides a method and system for robustly (using first order effects) controlling the bias point and radio frequency (RF) amplitude level of a modulator for an optical transmitter. The method comprises the steps of extracting an output dither signal component of a digital optical output signal from the optical transmitter to drive a feedback loop; measuring the output dither signal component in the feedback loop for comparison to an input dither signal to the modulator; comparing the output dither signal to the input dither signal to determine their difference; and, based on the difference between them, maintaining the bias point and the RF amplitude level at an optimum value by varying an input voltage to the modulator via the feedback loop.

One embodiment of the system of this invention comprises a laser for providing an input light, a modulator to modulate the input light and generate a digital optical output signal, a radio frequency (RF) feedback loop to control an RF input voltage to the modulator, a bias feedback loop to control a bias input voltage to the modulator, an RF amplitude dither circuit to provide an RF input dither signal to the RF voltage input, and a bias dither circuit to provide a bias input dither signal to the bias voltage input. The modulator can be a Mach-Zehnder modulator.

The method and system for first order RF amplitude and bias control of a modulator of the present invention provides an important technical advantage in that it uses first-order linear effects to control the RF amplitude to and the bias value of a modulator.

A still further technical advantage of the present invention is that it provides a method and system for first-order RF amplitude and bias control of a modulator that uses a feedback loop to control the RF amplitude, so that the RF amplitude can track changes in the modulator and in the RF train over temperature and time.

An even further technical advantage of the present invention is that it provides a robust circuit for first-order RF amplitude and bias control of a Mach-Zehnder modulator with a high signal-to-noise ratio and high bandwidth feedback loops.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein.

DETAILED DESCRIPTION OF THE INVENTION

Preferred embodiments of the present invention are illustrated in the FIGURES, like numerals being used to refer to like and corresponding parts of the various drawings.

The present invention provides a method and system for first-order RF amplitude and bias control of a modulator, such as a Mach-Zehnder modulator ("MZM"), that can more accurately control the integrity of an optical signal transmitted by a digital lightwave communications system. The present invention provides an advantage over the prior art in that feedback loops are used for both the RF amplitude and the bias signal to generate first-order effects, to more accurately maintain the RF amplitude and bias value at or near an optimum value. Both the RF amplitude and the bias feedback loops can automatically adjust to correct bias and RF amplitude values over time and physical changes. For example, the RF loop can adjust the RF amplitude by changing the gain of an RF amplifier as needed.

The present invention can be used to control the bias signal to a modulator by dithering the RF amplitude and to control the RF amplitude by dithering the signal bias. This involves changing either the gain on the RF amplifier or the bias signal in a regular way, for example, by having a 500 Hz square wave fed to the modulator as the bias dither or RF amplitude dither. By using RF amplitude dithering to control the bias, and bias dithering to control the RF amplitude, the control signal output from the circuit implementing the method and system of this invention will also be at 500 Hz (or at whatever frequency the dither signal is provided). Having the output control signal at the same frequency as the dither signal results in a first-order linear effect providing a more robust and sensitive means of control for the modulator. Both the bias and the RF amplitude in a system implementing the method and system of the present invention are controlled by first-order effects (the feedback loops use the first-order effects to generate a control signal).

Figure 1:
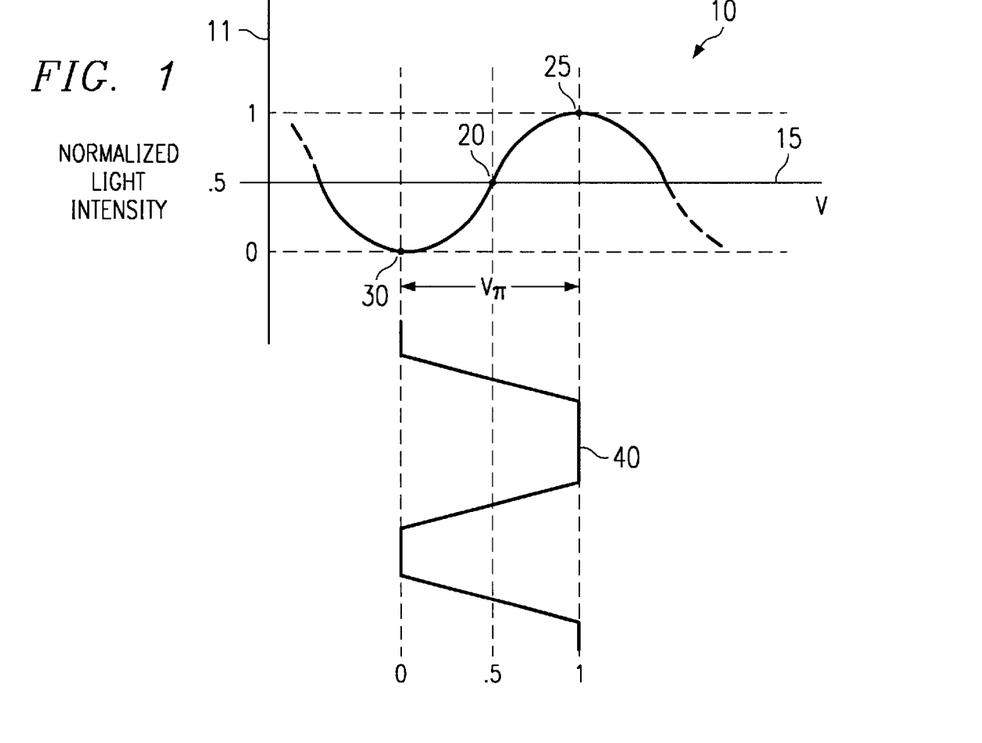
FIG. 1 shows a typical transfer function for a modulator, such as a Mach-Zehnder modulator, of this invention.

Every modulator, such as an MZM, has a distinctive transfer function. A transfer function is a curve representing the points at which a modulator will transition from no output to maximum output. FIG. 1 shows a typical modulator transfer function 10 such as may be associated with an MZM used in the present invention. Transfer function 10 has a normalized light output of from zero to one, as shown on Y axis 11, corresponding to the digital optical signal output from the modulator. The X axis 15, labeled in volts, illustrates the $V_\pi$ of the modulator. Point 20 of FIG. 1 indicates the optimum bias point, called quadrature. Quadrature point 20 is the point midway between peaks 25 and 30 of the transfer function along both the X and Y axis. FIG. 1 also shows a superimposed data signal 40 and its relation to the transfer function 10. Along its own X axis (corresponding to Y-axis 11), data signal 40 oscillates between normalized values zero and one. The distance along the X-axis between peaks 25 and 30 of transfer function 10 is referred to as $V_\pi$.

The preferred (optimum) value for the RF amplitude input voltage and bias input voltage signal are such that the bias input voltage is at quadrature and the RF amplitude input voltage is equal to $V_\pi$. The RF amplitude input voltage is the amplitude of the RF data signal that will be converted to an optical data signal by the modulator. The RF data signals are applied to the modulator to modulate the light from a laser such that when the RF amplitude signal goes high, the modulator would pass a full light signal, and when the RF amplitude signal goes low, the modulator would pass a zero light signal, as is shown in FIG. 1. The RF amplitude can be thought of as being superimposed on the transfer function 10.

Note, however, that each modulator can have its own unique $V_\pi$ and a different quadrature bias point. $V_\pi$ can range, for example, from approximately +3 to approximately +5 volts peak-to-peak. Typically, the RF amplitude will not vary by much over time, although it can vary over temperature. However, the bias point can and may vary greatly with time.

In this discussion of the present invention, normalized values are used to describe the modulator output (from zero to one), and not the actual output values, because the modulator itself does not supply any light. Rather, a laser output is provided as an input to the modulator, as discussed later as part of FIGS. 8 and 10. The laser is operated at a constant current, which provides a constant output power (signal). The constant output signal is input to the modulator. The modulator output thus depends on the output power of the laser. By using normalized values in our discussion, the discussion applies equally to any input power laser. A "0" value thus corresponds to no light output and a value of "1" corresponds to 100% of the light output.

The optimal point for the bias input voltage signal value is thus at a mid-point along transfer function 10. At this bias value, when the modulator switches from high to low, the maximum differential in output will occur. If, for example, the bias value were instead at a peak of the transfer function (points 25 or 30 of FIG. 1), then when switching from high to low (or vice-versa), no difference in output would occur. The bias value should be selected to provide the best extinction ratio (the ratio between full light and no light). For the maximum extinction ratio, the bias is set at quadrature with an RF amplitude level equal to $V_\pi$. The goal is thus to be biased at one-half power.

Figure 2:
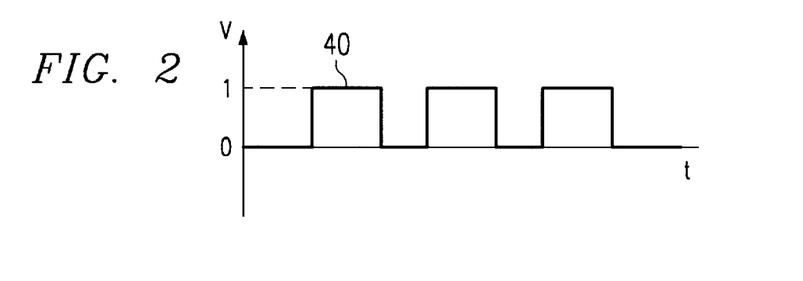
FIG. 2 is a horizontal view of digital data signal 40 of FIG. 1.

As shown in FIG. 1, when an RF data signal is input into a modulator and acts upon the input laser light in accordance with the analog transfer function, digital data signal 40 is output as a series of highs and lows corresponding to the analog transfer function's swings around the bias point, which is preferably at quadrature 20. Digital data signal 40 of FIG. 1 is the digital data signal 40 of FIG. 2 turned sideways and superimposed on the transfer function for illustration purposes. Data curve 40 of FIGS. 1 and 2 can represent either 2.5-gigabyte or 10-gigabyte per second data (or other bandwidth data) output from modulator as a lightwave output. An RF data signal with an amplitude equal to $V_\pi$ results in a digital data signal 40 with highs and lows equal to the full normalized values of 0 and 1. The maximum extinction ratio is thus achieved.

Figure 3:
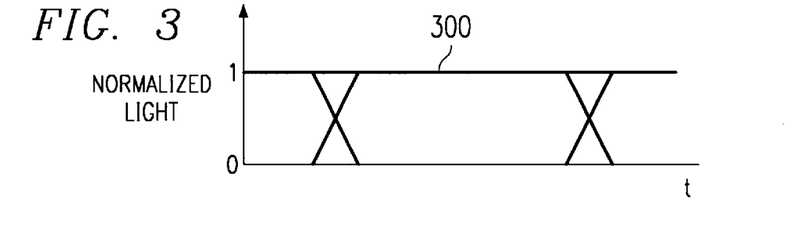
FIG. 3 is a typical eye diagram of the data signals received at an optical receiver.

FIG. 3 is an "eye diagram" with axes of time and normalized light, that shows the normalized light received at the receiver of a digital lightwave transition system. The transitions occurring in the output data are shown in FIG. 3 as viewed on an oscilloscope and correspond to the 1's and 0's of a digital signal. FIG. 3 shows a random sample of the signal as viewed on an oscilloscope at the receiver end of a fiber. The oscilloscope takes a clock signal that is synchronous with the data signal and divides the data into small sections that are then sampled. A series of random 1's and 0's thus appear and form eye diagram 300.

The transitions shown as X's in eye diagram 300 of FIG. 3 correspond to the swings in the transfer function around the bias point. For example, peak point 25 of FIG. 1 corresponds to a normalized light value of one on FIG. 3. Similarly, peak point 30 corresponds to a normalized light value of zero on eye diagram 300. The transitions marked as X's appear this way on an oscilloscope because they are not perfect, instantaneous transitions, but rather they span some period of time. The up slopes and down slopes forming the X's in eye diagram 300 correspond to the swing from peak 30 to peak 25 of FIG. 1, and the swing in value from zero to one of data curve 40. Eye diagram 300 thus corresponds to the data signal at the receiver end of a transmission system implementing the method and system of this invention.

The aim of this invention is to have the biggest spread possible in eye diagram 300 so that the transitions are clear and defined and thus easily discernable by a receiver at the receiver end of the transmission system. For example, if the RF data amplitude is smaller than $V_\pi$, eye diagram 300 of FIG. 3 will shrink up because the switch from light to no light will be going from not quite minimum to not quite maximum. The same will occur if the RF data amplitude is greater than $V_\pi$. Any time the amplitude of the RF data signal is not equal to $V_\pi$, a smaller distribution occurs in eye diagram 300 of FIG. 3.

Therefore, when the RF data amplitude is not equal to $V_\pi$, eye diagram 300 becomes compressed and the data transitions become harder for a receiver to discern, possibly resulting in data corruption or loss can occur.

Controlling the RF amplitude, however, is only half the story. The bias voltage also has to be at or near the optimum quadrature point. Quadrature is defined as the mid-point of the normalized spread of the transfer function. Perhaps the best way to visualize the relationship between the bias signal and RF amplitude is that the bias voltage is supplied to the modulator as a DC voltage to set up where on transfer function 10 the modulator will operate. The RF data signal is supplied with no DC and, by itself, would be symmetrical about zero. However, the bias loop supplies the DC portion around which the RF data signal will be symmetrical.

The bias DC voltage is thus the voltage value around which the AC RF data signal will continually swing to modulate the laser light input to the modulator and generate as output the digital 1's and 0's representing the RF data signal. If the bias value is off from the point of quadrature, then even if the RF amplitude is at the optimum value of $V_\pi$, the normalized output data, and hence eye diagram 300 of FIG. 3, will be distorted because the modulator output is not going to minimum or to the maximum. Eye diagram 300 will become more narrow, dispersed, and, together with the noise inherent in WDM systems, can result in the output signal being difficult to discern by a receiver. A receiver will thus lose sensitivity and data can be corrupted or lost.

One reason the method and system of this invention seeks to control the RF data amplitude is that as the transmitted optical data signal travels through numerous kilometers of fiber to get to a receiver, along the way it will be optically amplified, which adds noise to the signal. From a receiver's viewpoint, if eye pattern 300 is noisy and hard to discern, the sensitivity of the receiver will suffer. Data corruption or loss can then occur, requiring a decrease in the distance between transmitter and receiver to ensure the integrity of the data signal.

Figure 4:
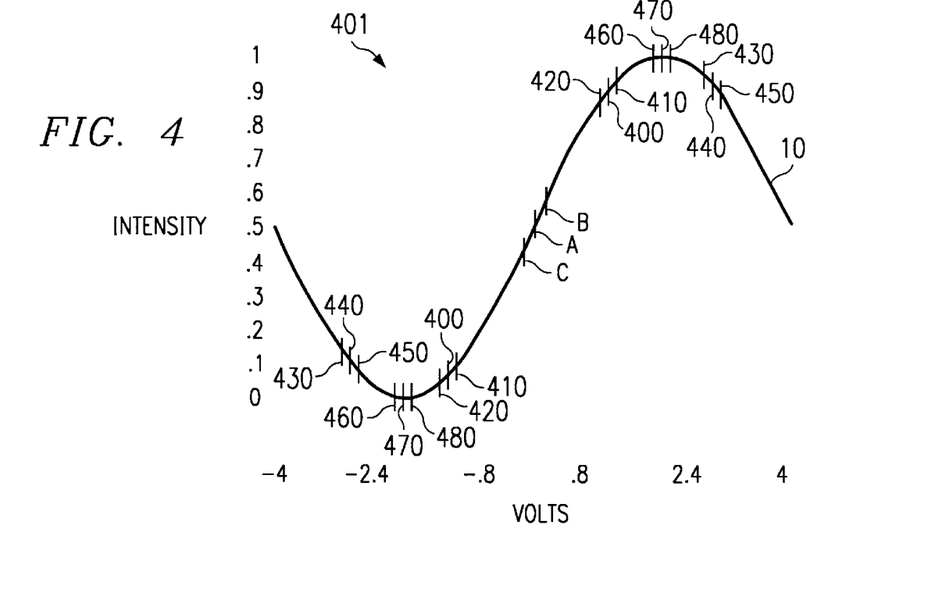
FIG. 4 is a more detailed graph of a modulator transfer function illustrating how dithering of the bias signal can be used to control RF amplitude.

FIG. 4 is a graph of a transfer function 10 having a $V_\pi$ equal to four, used to illustrate how the bias of an MZM modulator can be dithered to control the RF amplitude. The Y axis of graph 401 indicates the intensity of the light output from the modulator and the X axis indicates units of voltage. Assuming in FIG. 4 that the bias voltage is set at quadrature, the RF amplitude signal will swing symmetrically about the quadrature point. If the RF amplitude is set too low, as indicated by sets of RF low points 400, 410 and 420, the change in the intensity of the modulator output as the bias is dithered is positive. For example, suppose the bias starts at point A and is dithered up to point B (i.e., the dither voltage goes more positive by a slight amount corresponding to the change from A to B), the RF amplitude will shift along with the bias voltage from initial points 400 to points 410. Similarly, if the bias were to be dithered low, as indicated by going from point A to point C, the RF amplitude would follow the bias and go from points 400 to points 420. The RF amplitude thus shifts along with the dither bias.

Figure 8:
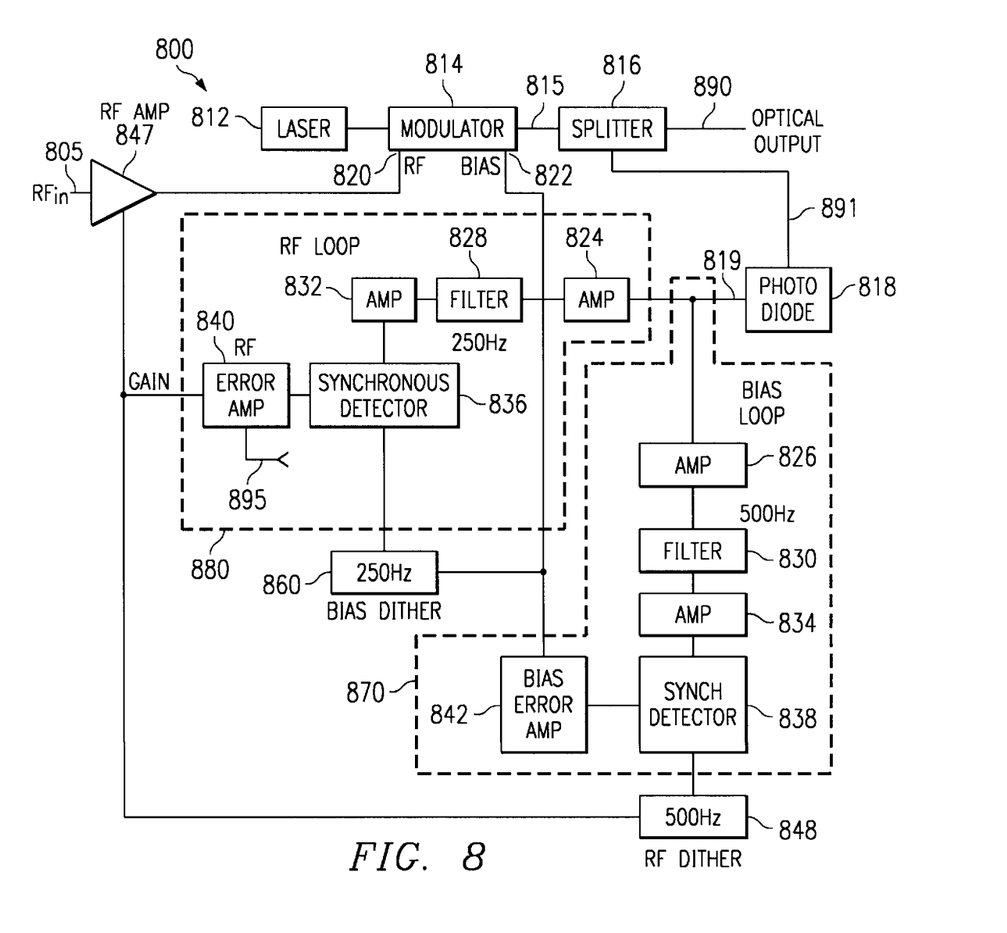
FIG. 8 is a block diagram of one embodiment of the system of this invention.

As can be seen in FIG. 4, when the bias is dithered high (point B), the 1 (high) output at point 410 is slightly higher than the 1 output at point 420, corresponding to when the bias is dithered low to point C. The same relationship is true for the zero (low) outputs. Overall, there is a positive increase in the intensity of the modulator output. In other words, the output from photodiode 818 of FIG. 8 is in phase with the dither signal. Note that this has nothing to do with the RF data signal itself, because the RF data is input to the modulator at too fast a rate and gets converted to an average amount of light.

If, on the other hand, the RF amplitude level is greater than $V_\pi$, as indicated by sets of RF high points 430, 440 and 450, then the change in the intensity of the modulator output is negative as the bias is dithered. As shown in FIG. 4, if the bias is dithered high from point A to point B, both the 0 and the 1 outputs at points 450 are lower than the 0 and 1 outputs at points 430, corresponding to when the bias is dithered low, from point A to point C. Therefore, both the 1 and 0 data are lower when the bias is dithered high than when the bias is dithered low, resulting in an inverted signal. The photodiode 818 output and the bias dither signal are thus out of phase. This is the opposite result from when the RF amplitude level is set too low.

Lastly, if the RF amplitude level is equal to $V_{90}$, as shown by sets of $V_\pi$ points 460, 470 and 480, then if the bias is dithered from point A to point B, or from point A to point C, the modulator output intensity is roughly equal, regardless of the dither signal value. With the RF amplitude at $V_\pi$, therefore, the change in output intensity from MZ modulator 814 is zero, or near zero, as the bias is dithered. The change in the modulator output intensity can therefore be either positive, negative or zero, and, depending on its value, the RF amplitude control circuit of FIGS. 8 and 10 can correct the RF amplitude value in an attempt to make it equal to $V_\pi$.

Figure 5A:
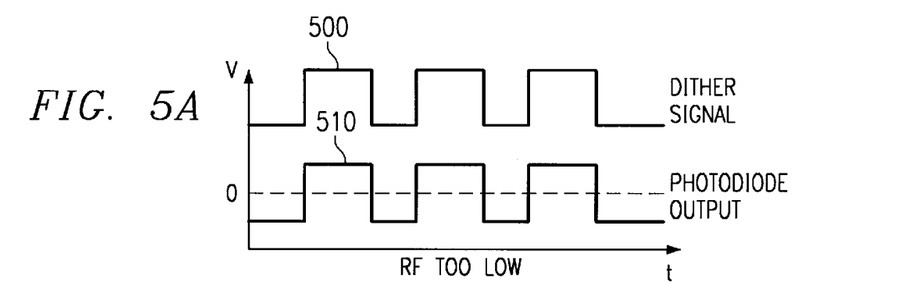
FIGS. 5A, 5B and 5C compare bias dither and photodiode output signals for the cases of RF amplitude less than, greater than, and equal to $V_\pi$.
Figure 5B:
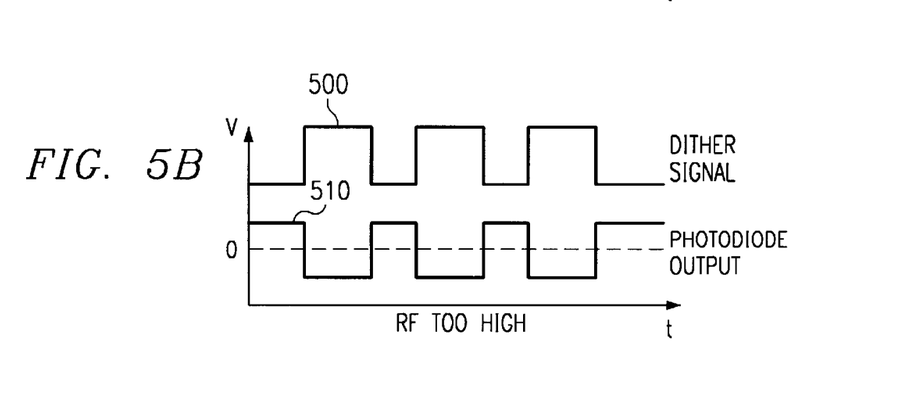
Figure 5C:
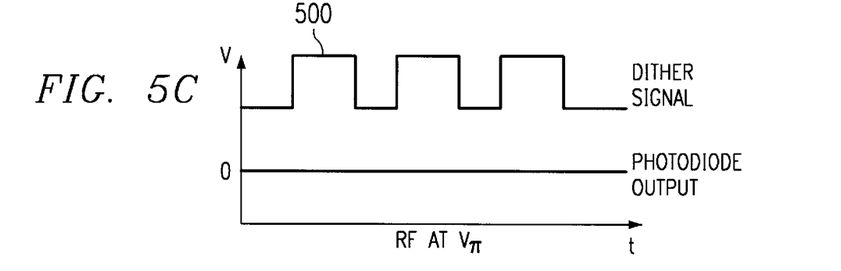

FIGS. 5A, 5B and 5C illustrate the three conditions discussed above of having the RF amplitude lower than, greater than, or equal to $V_\pi$ while the bias signal is dithered around the quadrature point. FIG. 5A shows dither signal 500 and photodiode output signal 510 in phase with one another, as discussed above, for the case of the RF amplitude lower than $V_\pi$. FIG. 5B shows dither signal 500 and photodiode output signal 510 out of phase, corresponding to the RF amplitude level being greater than $V_\pi$. Lastly, FIG. 5C shows dither signal 500 with a corresponding photodiode output signal 510 that is flat, for RF amplitude at $V_\pi$, indicating a zero change in the output intensity of the light from the modulator, such as modulator 814 of FIG. 8. The way in which photodiode output 510 is used by the circuits of FIGS. 8 and 10 to control the RF amplitude will be discussed below in reference to those FIGURES.

Figure 6:
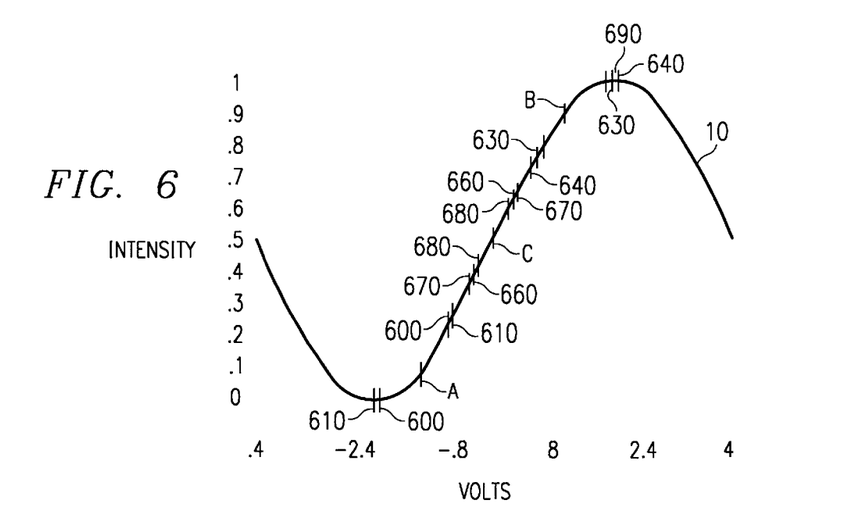
FIG. 6 is a more detailed graph of a modulator transfer function illustrating how dithering of the RF amplitude can be used to control the modulator bias signal.

FIG. 6 is a graph of transfer function 10 of FIG. 1 used to illustrate how the RF amplitude can be dithered to control the bias of, for example, modulator 814. The explanation for FIG. 6 is similar to that of FIG. 4, however as the RF amplitude is dithered from high to low, the bias point does not follow the change in RF amplitude, as the RF amplitude followed the change in bias in FIG. 4. What is made clear by dithering of the RF amplitude to control the bias point, however, is the importance of first-order effects versus second-order effects. This is because the changes in the output intensity of modulator 814 as the RF amplitude is dithered will depend more on the slope of the transfer function from point-to-point than on shifts along the transfer function in the same direction, as was the case in FIG. 4.

For example, if the bias is set too low, as shown by point A in FIG. 6, then as the RF amplitude is dithered high from points 600 to points 610 (i.e., the RF amplitude width is increasing), the relative change in intensity at the upper end of the RF amplitude from that at the lower end of the RF amplitude is greater, resulting in a net positive change in the output intensity of modulator 814. In FIG. 6, the location of the superimposed RF signal has been chosen with one end corresponding to the valley of transfer function 10 to more clearly illustrate the changes in slope, but the same analysis holds true regardless of the location of the RF signal along transfer function 10.

Similarly, if the bias is set too high, as shown by point B, the change in the output intensity of the signal from modulator 814 will be negative. In other words, as the RF amplitude is dithered high, the output change will go low; as the RF amplitude is dithered low, the output change will go high. For example, as the RF amplitude is dithered high from point 630 to point 640, the net change in intensity along the lower end of the RF amplitude is greater than that at the higher end (located at peak 690 of transfer function 10), resulting in a net decrease in the intensity of the output from modulator 814.

Lastly, if the bias is set at quadrature (the preferred value), as indicated by point C, then as the RF amplitude is dithered high (from points 660 to points 670) or low (from points 660 to points 680), the net change on the high side of the RF amplitude signal will equal the net change on the low side, resulting in a zero net change in the intensity of the output from modulator 814. The location of the RF amplitude signal along transfer function 10 for all three cases discussed above was chosen to best illustrate the changes involved. However the principles remain the same regardless of the placement of the RF amplitude signal along transfer function 10.

Dithering of the RF amplitude comprises superimposing the dither signal (e.g., 500 Hz signal) on the gain of an amplifier providing the RF data signal. The RF amplitude, in fact, will be centered at the bias point and will typically be of a larger value than that shown in FIG. 6. The RF amplitudes in FIG. 6 were chosen small for illustrative purposes.

Figure 7A:
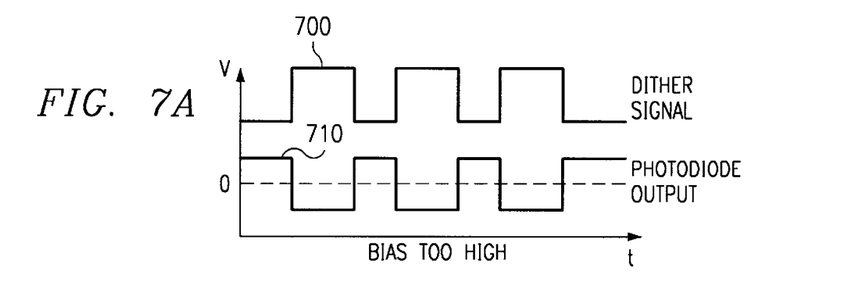
FIGS. 7A, 7B and 7C compare RF amplitude dither and photodiode output signals for the cases of bias value less than, greater than, and equal to quadrature.
Figure 7B:
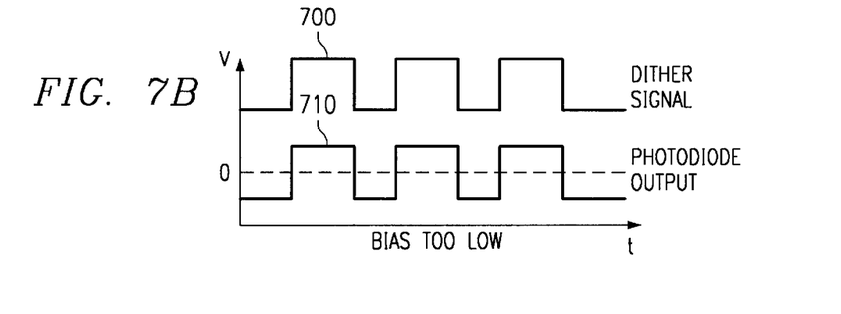
Figure 7C:
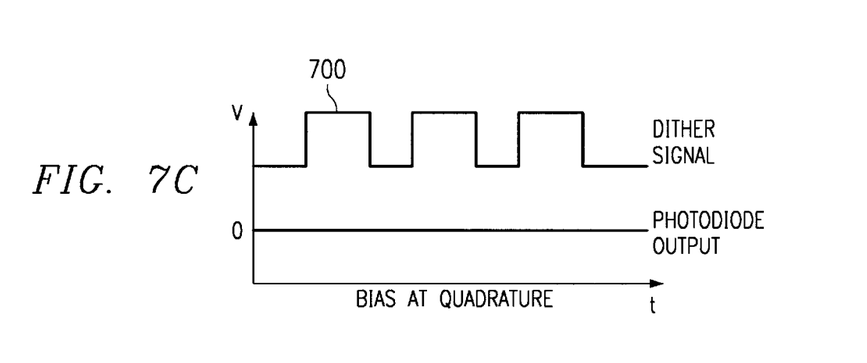

FIGS. 7A, 7B and 7C are similar to FIGS. 5A, 5B and 5C and illustrate the relationship of the RF amplitude dither signal to the photodiode 818 output signal when the bias value is greater than quadrature, less than quadrature and at quadrature. As is the case when the RF amplitude is greater than $V_\pi$, when the bias is greater than quadrature, the photodiode 818 output 710 is out of phase with the RF dither signal 700, as shown in FIG. 7A. FIG. 7B shows that when the bias is less than quadrature, then as RF dither signal 700 changes, photodiode 818 output signal 710 changes in phase. Lastly, in FIG. 7C, when the bias is at quadrature, changes in the RF amplitude caused by RF dither signal 700 result in no net change in the output of photodiode 818. Photodiode output signal 710 is thus a flat line (zero).

As in the case of the bias dither being used to control the RF amplitude, the RF amplitude dither can be used to control the bias, as explained below in conjunction with FIGS. 8 and 10. An advantage of this invention is that first-order effects are used to control the bias and RF amplitude, and not second-order effects. This is important because it can result in a higher signal level, and thus the signal-to-noise ratio on the dither (the recovered signal input into photodiode 818 of FIG. 8) is higher, yielding a more robust and faster loop. The advantage of this is that a system implementing this invention does not require as much amplification. Another way to look at it is that not as much dither is required in the first place. If a feedback circuit instead used second-order effects, more dither would have to be added just to get the recovered photodiode signal level up out of the noise, and the higher dither itself would add noise to the output signal as a consequence. The eye pattern of FIG. 3 would thus close up slightly when using more dither.

The method and system of this invention can be used in lightwave transmission systems based on, for example, the SONET or pseudo-random bit sequence ("PRBS") formats, and with systems that employ forward error correction schemes. In particular, OC48 and OC192 SONET format systems can be used. FIG. 8 is a block diagram of one embodiment of the circuit for first-order RF amplitude and bias control of a modulator of the present invention. Circuit 800 includes laser 812 that provides the light to modulator 814 that will be modulated to generate digital optical data. Laser 812 can be any laser, as known to those in the art, for use in a lightwave transmission system. Modulator 814 includes RF input port 820 and bias input port 822. The laser light from laser 812 is modulated within modulator 814 based on the inputs into RF input port 820 and bias input port 822. Modulator 814 provides the modulated signal to splitter 816, which splits modulated signal 815 into transmitter optical output signal 890 and output dither signal 891. Output dither signal 891 is forwarded to photodiode 818. Photodiode 818 provides feedback signal 819 that will be used to control bias feedback loop 870 and RF feedback loop 880 to maintain RF amplitude and bias at or near optimum. Modulator 814 can be any modulator that has a transfer function centered around the half life of the modulated $V_\pi$. For example, modulator 814 can be a Mach-Zehnder modulator or similar modulator.

The signal from photodiode 818 is fed to both RF feedback loop 880.and bias feedback loop 870. RF feedback loop 880 includes amplifier 824, which amplifies the signal from photodiode 818 at the frequency for the loop. In the embodiment shown in FIG. 8, the bias dither frequency is 250 Hz, so amplifier 824 amplifies the signal at 250 Hz and filters out any external noise. From amplifier 824, the signal is fed to filter 828, which filters the signal at 250 Hz to remove any residual data signal and noise and provides a 250 Hz feedback dither signal to amplifier 832. Amplifier 832 further amplifies the filtered signal and forwards the signal to synchronous detector 836. Amplifiers 824 and 832 provide the amplification necessary to get the photodiode 818 output signal level high enough for the synchronous detector 836. This is because synchronous detector 836 inserts some offsets into the signal and the amplification gets the signal level high enough to make the offsets insignificant. Amplifiers 824 and 832 also set the loop gain for the entire RF feedback loop 880. The level of gain for the loop can determine the speed of the loop. Amplifiers 824 and 832 can be off-the-shelf operational amplifier circuits. Filter 828 can be a switched capacitor filter, available off-the-shelf, such as those manufactured by National Semiconductor. Synchronous detector 836 comprises an operational amplifier and an analog switch.

The operational amplifier that is part of synchronous detector 836 has a gain that flips between +1 and −1. In other words, the operational amplifier flips between being a non-inverting amplifier and an inverting amplifier in synchronization with the bias or. RF dither signal. Thus, when the dither signal is low, the gain of synchronous detector 836 is −1. When the dither signal is high, synchronous detector 836 has a gain of +1.

Figure 9:
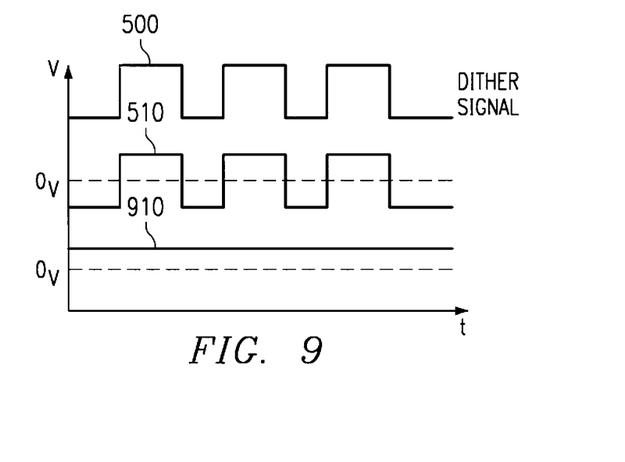
FIG. 9 is a graphical representation of the gain characteristics of synchronous detector 836 of FIG. 8.

FIG. 9 is a graphical representation of the gain characteristics of synchronous detector 836. The example shown in FIG. 9 corresponds to the situation where the bias signal is dithered to control the RF amplitude with the RF amplitude less than $V_\pi$. In this case (see FIG. 5A), dither signal 500 and the photodiode output signal 510 are in phase, as previously discussed. Therefore, as shown in FIG. 9, when the photodiode 818 output 510 is less than zero volts, the gain of synchronous detector 836 is −1, which inverts the photodiode output signal to a positive value and forwards it as an output from synchronous detector 836. Similarly, when the photodiode output 510 is greater than zero volts, the gain of synchronous detector 836 is +1 (in synch with the dither signal), resulting again in a positive output signal 910 from synchronous detector 836.

Synchronous detector 836 thus acts as a rectifier and changes the AC photodiode output signal 510 (feedback dither signal) into a DC synchronous detector output signal 910. In the case where photodiode output signal 510 is in phase with dither signal 500, the output signal 910 from synchronous detector 836 will be a positive value, as shown in FIG. 9. In the case where photodiode output 510 (or 710 of FIG. 7) is out of phase with dither signal 500 (700), the output signal 910 from synchronous detector 836 will be a negative signal. Lastly, in the case where photodiode output signal 510 is a flat (zero) output (indicating no change in the output intensity from modulator 814), the output of synchronous detector 836 is zero or flat (to match the photodiode output 510). The photodiode output 510 is actually zero (for the bias) when the bias is at quadrature or (for the RF amplitude) when the RF amplitude is at $V_\pi$. Synchronous detector output 910 can be slightly positive or slightly negative, not necessarily −1 or +1, because the photodiode output is itself typically only slightly positive or slightly negative, not necessarily +1 or −1. The +1 and −1 values are normalized values.

The positive and negative portions of photodiode output 510 of FIG. 9 are converted by synchronous detector 836 to outputs of the same magnitude because photodiode output signal 510 is an AC signal that is symmetric around zero. Synchronous detector 836 will continually adjust its gain to match the dither signal into modulator 814, providing either a slightly positive or a slightly negative DC voltage output 910 to RF error amplifier 840. DC voltage output 910 from synchronous detector 836 to RF error amplifier 840 can be used to control RF amplifier 847. Note that when photodiode output signal 510 is zero (flat), the output from synchronous detector 836 will also provide a zero output.

In this regard, for illustration purposes only, consider a situation where the output from synchronous detector 836 might be zero. The function of RF feedback loop 880 is to make the output from photodiode 818 zero (keeping the RF amplitude at or near $V_\pi$), at which point the output from synchronous detector 836 is also zero. However, in practice, instead of the voltage from synchronous detector 836 being zero, a slight positive offset is provided as pedestal voltage 895. This is because the voltage output from synchronous detector 836 would be zero if the data transitions were exact, but they are not. Because the transitions are not exact, the synchronous detector needs to see a slight offset at the nominal (zero) point. In the case of bias loop 870, the pedestal voltage 895 is not required because the transitions do not affect the bias loop in any way.

Pedestal voltage 895 is fed into RF error amplifier 840. Pedestal voltage 895 is on the order of about 30–50 millivolts for a photodiode DC voltage normalized to one volt. Pedestal voltage 895 is variable, can be adjusted by a technician, and it is used to adjust the RF amplitude level. A technician can either use an oscilloscope and adjust for the best eye pattern (FIG. 3) or adjust for the best bit-error rate. Pedestal voltage 895 is a set-and-forget variable. Pedestal voltage 895 is required in the RF loop, but in the bias feedback loop 870 it can be an optional feature. By feeding an optional pedestal voltage into bias error amp 842, the bias level can be adjusted to be offset by some preset value. This could, for example, help in making the eye pattern of FIG. 3 sharper.

The output signal from synchronous detector 836 is input to RF error amp 840, which also comprises a low frequency filter to filter out the high frequency residual on the signal provided by synchronous detector 836. The output signal from synchronous detector 836 is a DC signal. RF error amplifier 840 amplifies and filters this DC signal. The output signal from RF error amplifier 840 is the gain control input to RF amplifier 847.

Thus, if, for example, in the situation where the RF amplitude is too high, the change in the intensity of the light output from modulator 814 will be negative, resulting in the dither signal and the photodiode 818 output signal being out of phase. As explained above, the output from synchronous detector 836 will then be slightly negative. This slightly negative DC signal is input to RF error amplifier 840, which amplifies it and forwards the amplified DC signal to RF input amplifier 847 as a gain control signal. The slightly negative gain control signal into RF amplifier 847 results in a decrease in the amplitude of the RF data signal (voltage) sent to the RF input port 820 of modulator 814. The RF amplitude is adjusted this way incrementally until it is returned to (or near) the optimal value of $V_\pi$. This feedback loop repeats in a continuous fashion to constantly control and maintain the RF amplitude near or at $V_\pi$.

RF data input 805 is the data signal that will be transmitted in the form of optical light from modulator 814 (i.e., it modulates the light input from laser 812). The RF amplitude dither is provided by RF dither circuit 848 at, for example, 500 Hz. Dither circuit 848 provides a dither signal to the gain input to RF input amplifier 847 and also to synchronous detector 838 within bias feedback loop 870, as will be explained below. The bias dither signal is provided by bias dither circuit 860, which, like RF dither circuit 848, provides a dither signal to the input to bias port 822 of modulator 814 and to synchronous detector 836 in the RF feedback loop 880. The bias dither signal and RF dither signal are fed into the RF feedback loop synchronous detector 836 and the bias feedback loop synchronous detector 838, respectively, to synchronize the gain of synchronous detectors 836 and 838 to the respective dither signal.

Bias loop 870 is very similar to RF feedback loop 880 and consists of amplifier 826, filter 830, amplifier 834, bias synchronous detector 838, and bias error amplifier 842. Each of the components within bias loop 870 provides the same functions as the corresponding components in RF feedback loop 880, with the exception that filter 830 can be a different frequency filter and bias error amplifier 832 need not have a pedestal voltage input. Otherwise, the two loops work in essentially the same manner and their description is likewise essentially the same.

It is important to note that the dither signals provided by RF amplitude dither circuit 848 and bias dither circuit 860 may be such that one is one-half the frequency of the other. In the embodiment of FIG. 8, the RF amplitude dither is set at 500 Hz and the bias dither is set at 250 Hz. This is because dither signals are typically square waves (i.e., 50% duty cycle square waves) that only provide discernible signal at the fundamental frequency and the odd harmonics of the fundamental frequency. Therefore, for a 250 Hz dither square wave, the frequency components available are 250 Hz, 750 Hz, 1250 Hz, etc. For a 500 Hz dither signal, the frequency components available are 500 Hz, 1500 Hz, 3000 Hz, and so on. In the embodiment of FIG. 8, there are thus no frequency components that overlap between the RF amplitude dither and the bias dither. This is important because the output provided from photodiode 818 includes frequency components for both RF and bias dither signals that must be filtered out within their respective loops. If the frequency components for each of the dither signals (such as error harmonics) overlap, it is very difficult to distinguish between them. It is therefore important that dither signals are chosen so that they and their harmonics do not overlap.

Figure 10:
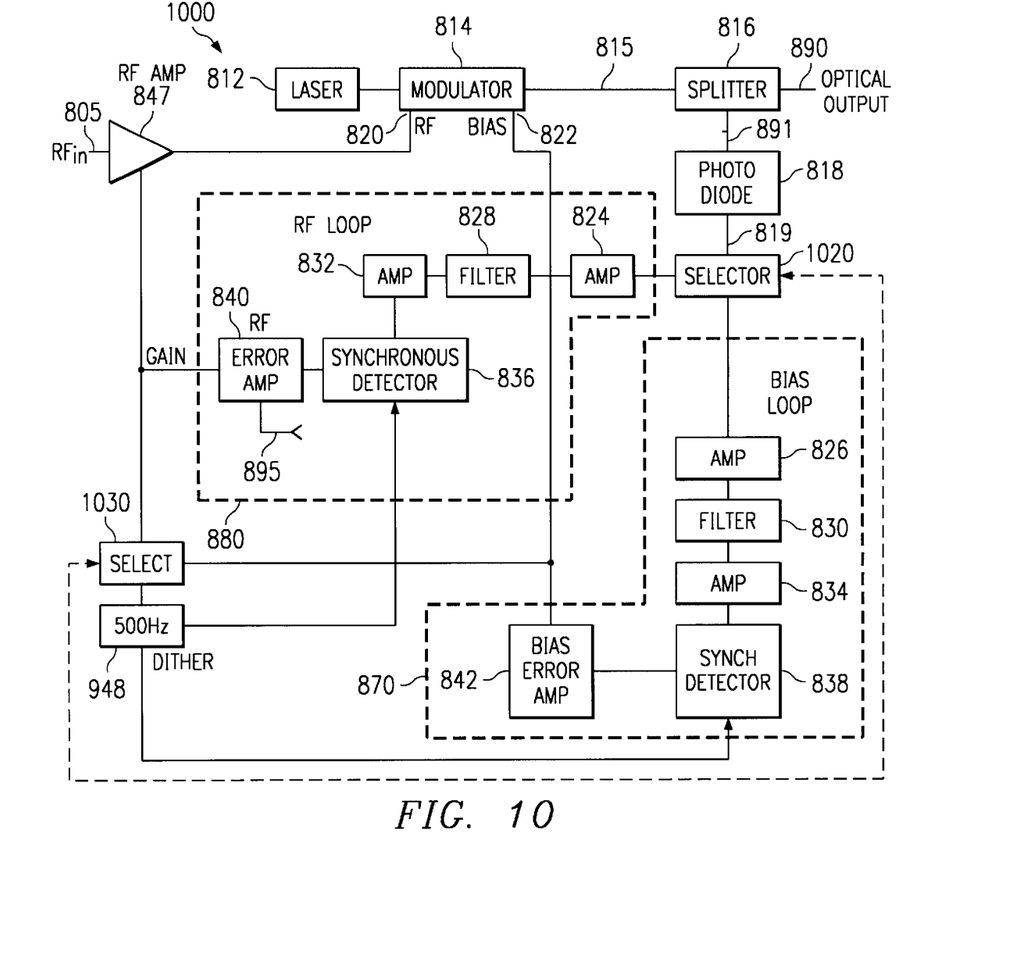
FIG. 10 is a block diagram of another embodiment of the system of this invention.

FIG. 10 shows another embodiment of the method and system for first-order RF amplitude and bias control of a modulator of the present invention. Circuit 1000 of FIG. 10 is the same as circuit 800 of FIG. 8, with the exception that circuit 1000 includes synchronized selectors 1020 and 1030 and does not include bias dither circuit 860. Instead, circuit 1000 of FIG. 10 has a single dither circuit, dither circuit 948, which can be at any selected frequency, such as the 500 Hz frequency shown in FIG. 10. Dither circuit 948 can, using synchronized selectors 1020 and 1030, provide a dither signal to either the bias or the RF amplitude.

Therefore, the problems of overlapping dither frequencies of the first embodiment of this invention, as shown in FIG. 8, do not exist in the embodiment of FIG. 10.

Synchronized selector switches 1020 and 1030 are synchronized such that when one selector switch is open, the other is closed, and vice versa. In this way, the dither signal from dither circuit 948 can be selectively provided to either the gain control signal to RF amplifier 847 or to the bias control signal provided to bias input 822 of modulator 814. One disadvantage of the embodiment of this invention shown in FIG. 10 is that when switching between synchronized selector switches 1020 and 1030, the switching is normally done at about a 10 Hz to 30 Hz rate, which generates low frequency components in the control loop signals which must then be filtered out. These 10 Hz to 30 Hz signals are much more difficult to filter out than, for example, the 500 Hz dither signal, and can lead to increased noise in the bias and RF control signals. The eye pattern of FIG. 3 is thus made noisier. Note also that in the embodiment shown in FIG. 10, filters 828 and 830 are both of the same frequency, in this case 500 Hz.

The rate at which the circuit 1000 of FIG. 10 switches between synchronized selectors 1020 and 1030 can be pre-set at some arbitrary value. Typically, bias loop 870 is configured to be approximately five times faster than the RF feedback loop 880 (typically about 1 Hz on the bias loop). The bias loop might be, for example, at 1 Hz, and the RF loop set at 0.2 Hz. For various reasons, the bias loop needs to be faster than the RF loop. The end result is that since typically the bias loop is about five times faster than the RF loop, the switching between synchronized selectors is typically set as a 25%/75% split. Therefore, 25% of the time the dither signal is input to the RF gain, and 75% of the time the dither signal is input to the bias signal. This feedback cycle ratio of 3:1 typically results in more of a signal fed through the bias loop, making the bias feedback loop inherently faster than the RF feedback loop, even though both loops typically have the same component values, amplification and filters.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. A method for robustly controlling the bias point and radio frequency (RF) amplitude level of a modulator for an optical transmitter, comprising:

extracting an output dither signal component of a digital optical output signal from said optical transmitter to drive a feedback loop;

measuring said output dither signal component in said feedback loop for comparison to an input dither signal to said modulator;

comparing said output dither signal to said input dither signal to determine their difference; and based on said difference, maintaining said bias point and said RF amplitude level at an optimum value by varying an input voltage to said modulator via the feedback loop.

2. The method of claim 1, wherein said optical transmitter comprises:

a laser for providing an input light;

said modulator to modulate said input light and generate said digital optical output signal;

a radio frequency (RF) feedback loop to control an RF input voltage to said modulator;

a bias feedback loop to control a bias input voltage to said modulator;

an RF amplitude dither circuit to provide an RF input dither signal to said RF voltage input; and a bias dither circuit to provide a bias input dither signal to said bias voltage input.

3. The method of claim 2, wherein said bias voltage input can be controlled by said RF dither and wherein said RF voltage input can be controlled by said bias dither.

4. The method of claim 2, wherein said bias feedback loop and said RF feedback loop automatically compensate for changes over time in said optical transmitter caused by temperature or vibration.

5. The method of claim 2, wherein said bias dither and said RF dither are in a relationship where one is half the frequency of the other.

6. The method of claim 2, wherein said bias dither is at 250 hertz and said RF dither is at 500 hertz.

7. The method of claim 2, wherein there are no frequency components of said RF dither and said bias dither that overlap.

8. The method of claim 2, further comprising inputting a pedestal voltage into said RF feedback loop to further adjust said RF voltage input.

9. The method of claim 2, wherein said laser is operated at a constant input current.

10. The method of claim 1, wherein said feedback loop is an RF amplitude feedback loop, said output dither signal is an RF output dither signal, said input dither signal is an RF input dither signal, and said input voltage is an RF amplitude input voltage.

11. The method of claim 10, wherein said RF amplitude input voltage can be controlled by a bias dither.

12. The method of claim 1, wherein said feedback loop is a bias feedback loop, said output dither signal is a bias output dither signal, said input dither signal is a bias input dither signal, and said input voltage is a bias input voltage.

13. The method of claim 12, wherein said bias input voltage can be controlled by an RF input dither signal.

14. The method of claim 1, wherein said modulator is a Mach-Zehnder modulator.

15. The method of claim 1, wherein said optical transmitter is used to transmit optical data along a digital lightwave communications system.

16. The method of claim 1, wherein said feedback loop automatically compensates for changes over time in said RF amplitude or bias point caused by temperature or vibration.

17. The method of claim 1, further comprising inputting a pedestal voltage into said feedback loop to further adjust said input voltage.

18. The method of claim 1, wherein said measuring step further comprises measuring first-order linear effects of said output dither component to vary said input voltage.

19. The method of claim 1, wherein said feedback loop is a RF amplitude feedback loop.

20. The method of claim 1, wherein said feedback loop is a bias feedback loop.

21. The method of claim 1, wherein said optical transmitter is a SONET format optical transmitter within a SONET optical transmission system.

22. The method of claim 21, wherein said SONET optical transmission system is an OC48 or OC192 SONET system.

23. The method of claim 1, wherein said optical transmitter is a pseudo-random bit sequence ("PRBS") formats optical transmitter.

24. The method of claim 1, wherein said optical transmitter is an optical transmitter employing a forward error correction scheme.

25. The method of claim 1, wherein said preferred value for said bias point is at quadrature, and wherein said preferred value for said RF amplitude level is $V_\pi$.

26. A system for robustly controlling the bias point and RF amplitude level of a modulator for an optical transmitter, comprising:
  a laser for providing an input light;
  a modulator to modulate said input light and generate said digital optical output signal;
  a splitter to split said digital optical output signal into a transmitter output signal and an output dither signal component;
  a photodiode to provide a feedback signal;
  a radio frequency (RF) feedback loop to control an RF amplitude input voltage to said modulator;
  a bias feedback loop to control a bias input voltage to said modulator;
  an RF amplitude dither circuit to provide an RF input dither signal to said RF amplitude input voltage;
  a bias dither circuit to provide a bias input dither signal to said bias input voltage; and
  an RF input amplifier to receive and amplify an RF data input signal.

27. The system of claim 26, wherein said modulator is a Mach-Zehnder modulator.

28. The system of claim 26, wherein said optical transmitter is used to transmit optical data along a digital lightwave communications system.

29. The system of claim 26, wherein said bias input voltage can be controlled by said RF input dither signal, and wherein said RF amplitude input voltage can be controlled by said bias input dither signal.

30. The system of claim 26, wherein said bias feedback loop and said RF feedback loop automatically compensate for changes over time in said RF amplitude input voltage and in said bias input voltage caused by temperature or vibration.

31. The system of claim 26, wherein said bias input dither signal and said RF input dither signal are in a relationship where one is half the frequency of the other.

32. The system of claim 26, wherein said bias input dither signal is at 250 hertz and wherein said RF input dither circuit is at 500 hertz.

33. The system of claim 26, wherein there are no frequency components of said RF input dither signal and said bias input dither signal that overlap.

34. The system of claim 26, wherein said RF feedback loop further comprises:
  a first RF amplifier to amplify said photodiode feedback signal;
  a filter to filter out residual digital output signal data and provide an RF output dither signal;
  a second RF amplifier to amplify said RF output dither signal;
  a synchronous detector to rectify said RF output dither signal into a DC output signal; and
  an RF error amplifier to amplify and filter said synchronous detector DC output signal to provide a gain control signal to said RF input amplifier.

35. The system of claim 34, wherein said RF feedback loop further comprises a pedestal voltage input into said RF error amplifier to further adjust said RF amplitude input voltage.

36. The system of claim 34, wherein said synchronous detector further comprises an operational amplifier and an analog switch.

37. The system of claim 36, wherein said operational amplifier is either an inverting or a non-inverting amplifier in synchronization with said bias input dither signal.

38. The system of claim 26, wherein said bias feedback loop further comprises:
  a first bias amplifier to amplify said photodiode feedback signal;
  a filter to filter out residual digital output signal data and provide a bias output dither signal;
  a second bias amplifier to amplify said bias output dither signal;
  a synchronous detector to rectify said bias output dither signal into a DC output signal; and
  a bias error amplifier to amplify and filter said synchronous detector DC output signal to provide a bias input voltage to said modulator.

39. The system of claim 38, wherein said synchronous detector further comprises an operational amplifier and an analog switch.

40. The system of claim 39, wherein said operational amplifier is either an inverting or a non-inverting amplifier in synchronization with said RF input dither signal.

41. The system of claim 26, wherein said laser is operated at a constant input current.

42. The system of claim 26, wherein said optical transmitter is a SONET format optical transmitter within a SONET optical transmission system.

43. The system of claim 42, wherein said SONET optical transmission system is an OC48 or OC192 SONET system.

44. The method of claim 26, wherein said optical transmitter is a pseudo-random bit sequence ("PRBS") formats optical transmitter.

45. The method of claim 26, wherein said optical transmitter is an optical transmitter employing a forward error correction scheme.

46. A system for robustly controlling the bias point and RF amplitude level of a modulator for an optical transmitter, comprising
  a laser for providing an input light;
  a modulator to modulate said input light and generate said digital optical output signal;
  a splitter to split said digital optical output signal into a transmitter output signal and an output dither signal component;
  a photodiode to provide a feedback signal;
  a radio frequency (RF) feedback loop to control an RF amplitude input voltage to said modulator;
  a bias feedback loop to control a bias input voltage to said modulator;
  a dither circuit to provide an input dither signal to either said RF amplitude input voltage or said bias input voltage;
  synchronized selectors to select either said RF amplitude input voltage or said bias input voltage to receive said input dither signal; and
  an RF input amplifier to receive and amplify an RF amplitude input signal.

47. The system of claim 46, wherein said modulator is a Mach-Zehnder modulator.

48. The system of claim 46, wherein said RF feedback loop further comprises:
  a first RF amplifier to amplify said photodiode feedback signal;
  a filter to filter out residual digital output signal data and provide an RF output dither signal;
  a second RF amplifier to amplify said RF output dither signal;

a synchronous detector to rectify said RF output dither signal into a DC output signal; and an RF error amplifier to amplify and filter said synchronous detector DC output signal to provide a gain control signal to said RF input amplifier.

49. The system of claim 48, wherein said RF feedback loop further comprises a pedestal voltage input into said RF error amplifier to further adjust said RF input voltage.

50. The system of claim 48, wherein said synchronous detector further comprises an operational amplifier and an analog switch.

51. The system of claim 50, wherein said operational amplifier is either an inverting or a non-inverting amplifier in synchronization with said input dither signal.

52. The system of claim 46, wherein said bias feedback loop further comprises:

a first bias amplifier to amplify said photodiode feedback signal;

a filter to filter out residual digital output signal data and provide a bias output dither signal;

a second bias amplifier to amplify said bias output dither signal;

a synchronous detector to rectify said bias output dither signal into a DC output signal; and a bias error amplifier to amplify and filter said synchronous detector DC output signal to provide a bias signal to said modulator.

53. The system of claim 52, wherein said synchronous detector further comprises an operational amplifier and an analog switch.

54. The system of claim 53, wherein said operational amplifier is either an inverting or a non-inverting amplifier in synchronization with said input dither signal.

55. The system of claim 46, wherein said laser is operated at a constant input current.

56. The system of claim 46, wherein said optical transmitter is a SONET format optical transmitter within a SONET optical transmission system.

57. The system of claim 56, wherein said SONET optical transmission system is an OC48 or OC192 SONET system.

58. The method of claim 46, wherein said optical transmitter is a pseudo-random bit sequence ("PRBS") formats optical transmitter.

59. The method of claim 46, wherein said optical transmitter is an optical transmitter employing a forward error correction scheme.

* * * * *